United States Patent [19]

Kolossow

[11] Patent Number: 4,892,691

[45] Date of Patent: Jan. 9, 1990

[54] EXTRUSION METHOD AND APPARATUS FOR PRODUCING A FOAMABLE MIXTURE OF PLASTICS MATERIAL

[75] Inventor: Klaus-Dieter Kolossow, Hambühren, Fed. Rep. of Germany

[73] Assignee: Hermann Berstorff Maschinenbau GmbH, Hanover, Fed. Rep. of Germany

[21] Appl. No.: 215,319

[22] Filed: Jul. 5, 1988

[30] Foreign Application Priority Data

Jul. 3, 1987 [DE] Fed. Rep. of Germany ....... 3722050

[51] Int. Cl.⁴ ........................ B29C 47/50; B29C 67/22
[52] U.S. Cl. ......................................... 264/54; 264/51; 264/53; 425/204; 425/205
[58] Field of Search ............................. 264/53, 51, 54; 425/205, 204

[56] References Cited

U.S. PATENT DOCUMENTS

| | | | |
|---|---|---|---|
| 2,987,774 | 6/1961 | Jacobson | 264/53 |
| 3,522,628 | 8/1970 | Eberle et al. | 264/53 X |
| 3,817,669 | 6/1974 | Buckner | 264/53 X |
| 3,856,904 | 12/1974 | Ayres | 264/53 X |

FOREIGN PATENT DOCUMENTS 3316838 11/1984 Fed. Rep. of Germany .
2483842 12/1981 France .................. 425/205

Primary Examiner—Jeffery Thurlow
Attorney, Agent, or Firm—Foley & Lardner, Schwartz, Jeffery, Schwaab, Mack, Blumenthal & Evans

[57] ABSTRACT

A method and apparatus are provided for producing a mixture of plastics materials which are capable of being foamed with propellants. The method permits plastics materials, which require considerably different processing conditions, to be fused, homogenized and mixed with a propellant in an extruder. By feeding a high-molecular weight high-temperature resistant plastics material into the extruder through a first feed opening and subsequently feeding a low-molecular weight, low-temperature-resistant plastics material into the extruder through a second feed opening disposed downstream of the first feed opening but where the first plastics material is in a fused and homogeneous state and by introducing the propellant through a third feed opening downstream of the second feed opening, the desired homogenisation of the two plastics materials and propellant is ensured.

11 Claims, 2 Drawing Sheets

EXTRUSION METHOD AND APPARATUS FOR PRODUCING A FOAMABLE MIXTURE OF PLASTICS MATERIAL

FIELD OF THE INVENTION

The present invention relates to an extrusion method and apparatus for producing a foamable mixture of plastics material. More particularly, the present invention relates to a method and apparatus of the type in which two extrusion devices are provided in tandem wherein the mixture of plastics material is homogenised with a propellant in the first extrusion device and is then fed into the second extrusion device in which it is cooled prior to being extruded in the form of a tubular film or a profile.

BACKGROUND OF THE INVENTION AND PRIOR ART DISCUSSION

In German Patent Specification No. 3 316 838 there is disclosed a method of producing a foam from a plastics material. The plastics material is processed in a tandem extruder system. In the first extruder, the material is fused and mixed with a propellant which is injected into the mixture. This first extruder is a single-screw extruder. Subsequently, the mixture of plastics material and propellant is conveyed into a second extruder wherein it is cooled to just below the reaction temperature of the propellant. The mixture is then extruded to form a tubular film.

It has become increasingly more important for foamed plastics materials to have specific properties. The properties include, inter alia, flame-resistancy, high resistance to acids, and resistance to high pressures, temperatures and/or tensions.

The production of such foamed plastics materials, based on high-quality plastics materials, presupposes that the products are capable of being produced in cellular or foamed form. This prerequisite is realised by the addition of supplementary materials which are suitable for producing foaming in extrusion systems because of their structure and properties.

It has, however, been found that it is extremely difficult to mix a high-molecular weight or high-temperature-resistant plastics material (macromolecule) and a low-molecular weight plastics material, or even a plastics material which had been rendered flame-resistant by additives, with a conventional plastics material and to create a homogeneous product therefrom.

On the other hand, it is commercially necessary to blend very expensive special plastics materials, such as, for example, PPO (polyphenylene oxide), with cheaper low molecular weight conventional plastics materials in order to reduce costs.

An additional problem arises when it is necessary to mix the plastics material homogeneously with a propellant. Since the propellants usually employed, such as fluorochlorohydrocarbons, aliphatic hydrocarbons or azodicarbonamide have properties which differ considerably from the plastics materials to be processed, homogeneous mixing is very difficult. In particular, the propellants can only be processed within narrow temperature and pressure ranges. A lack of homogeneity in respect of the mixture of plastics material and propellant results, which leads to inconsistent foaming. Thus, for example, different thicknesses and cell sizes are produced in a foamed film, or weak spots are formed in other products.

OBJECTS OF THE INVENTION

The present invention therefore seeks to provide a method in which expensive and high-molecular weight or high-temperature-resistant, foamable plastics materials can be blended, for better processability, with conventional foamable plastics materials whilst still producing desired properties in the end product.

The present invention also seeks to provide a method and apparatus in which the absorbtion and distribution of the propellant in the mixture of plastics materials is improved and which permits particular plastics materials to be mixed and homogenised in an extruder, the method permitting the adjustment of specific properties of a plastics material, such as its flame-, pressure-and heat-resistance.

SUMMARY OF THE INVENTION

According to the present invention, there is provided a method of producing a foamable mixture of plastics materials from two plastics materials having differing properties in a tandem extruder system, said tandem extruder system comprising two first and second extrusion devices, said first extrusion device defining sequential first, second and third feed apertures and having a variable throughput. The method comprising the steps of feeding a high-molecular weight high-temperature-resistant plastics material into said first extrusion device through said first feed aperture, fusing said material in said first extrusion device, feeding a second low-molecular weight low-temperature-resistant plastics material, together with a blowing agent, through said second feed aperture in said first extrusion device into said fused, homogenised high-molecular weight plastics material and fusing and homogenising said plastics material and blowing agent therewith, introducing a propellant into said fused and homogenised mixture of plastics materials and blowing agent through said third feed aperture in said first extrusion device, homogenising said mixture of plastics materials, blowing agent and propellant in the first extruder, transferring said homogenised and fused mixture into said second extruder, cooling said mixture in said second extruder and extruding said mixture in the form of a foamed tubular film or profile.

In feeding the high-molecular weight, high temperature-resistant plastics material into an extrusion device having a variable throughput, the dwell-time of the material in the extrusion device can be controlled. Accordingly by varying the speed of rotation of the screws, which is responsible for the throughput, an operator can ensure that the plastics material is subjected to heating in the extrusion device for as long as necessary. A twin-screw extruder is preferably used, the two screws having flights which substantially mesh with one another but pass one another, so that substantially all material disposed between the flights is advanced and virtually no residue remains stationary. Because of this arrangement, the dwell time of the material can be appropriately influenced.

Such plastics material, for example a high molecular weight polyphenylene oxide, is introduced into the first feed opening and is fused over an extruder length of up to ten times the diameter of the screws.

A low molecular weight plastics material, such as polystyrene, which needs less time for fusing, is then fed into the fused mass of the first plastics material and is fused therewith. Since the high molecular weight plastics material is a fused mass when the low molecular weight plastics material is added thereto, the fusion of the low molecular weight plastics material therewith is facilitated.

The low molecular weight plastics material is considerably less temperature-resistant and the addition thereof to the fused mass of the high molecular weight material does not cause thermal overloading of this plastics material. The homogenisation of the two plastics materials as fused masses is thus considerably enhanced.

A propellant is then injected into this fused mass of plastics materials and, in dependence upon the materials being treated, the mixing and dwell time of the propellant with the mixture of plastics materials is selected by suitably controlling the variable throughput.

If a plastics material to be fused is one which fuses very slowly, such as a styrene-maleic acid anhydride polymer, to which, for example, a flame-retardant component has previously been admixed is introduced in granulate or powder form through the first feed opening, the rate of rotation of the screw or screws is reduced and consequently the dwell time of the material to pass from the first to the second feed opening is increased.

This arrangement also ensures that the first plastics material is fused when it reaches the second feed opening, whereby the fusion process for the second plastics material is shortened.

The melting points of the two plastics materials and the fusion indices thereof are taken into consideration and, in consequence thereof, the fusion and homogenisation process is adapted to the individual properties of the plastics materials. The requisite processing conditions of very expensive plastics materials, which often constitute the high molecular weight material, are also taken into particular consideration.

The use of a chemical propellant has the advantage of being more environmentally desirable. The prerequisite therefor is that the extruder can be driven without pressure in the feed region of such a propellant. This is because the chemical propellant is normally incorporated into a plastics granulate or into a plastics powder and is then fed into the twin-screw extruder in granular or powder form.

If a chemical propellant is used, it has proved advantageous to provide a greater screw length for the twin-screw extruder, such extra length being at least approximately four times the diameter of the screws and extending downstream from the propellant feed opening. This achieves better mixing and homogenisation of the propellant in the fused mass of plastics material.

The introduction of the chemical propellant is effected, for example, after a screw length of 28 times the diameter of the screws and the homogenisation of the fused mass with the granular or pulverulent propellant is advantageously effected in the subsequent screw length of from four to six times the diameter of the screws.

Physical propellants may also be used. These are in a fluid form and are injected through a nozzle at a pressure which exceeds the pressure in the extrusion chamber.

A shorter screw length is required for the mixing and homogenisation processes.

A particularly advantageous effect is achieved if the blowing agent is introduced together with the low molecular weight plastics material, since the two constituents, within a minimal screw length, are mixed very intensively with the high molecular weight high temperature resistant plastics material, which latter is already in the form of a fused mass.

BRIEF DESCRIPTION OF THE DRAWINGS

A preferred embodiment of an apparatus in accordance with the present invention will be further described, by way of example, with reference to the accompanying drawings, in which.

DESCRIPTION OF PREFERRED EMBODIMENT

Figure 1:
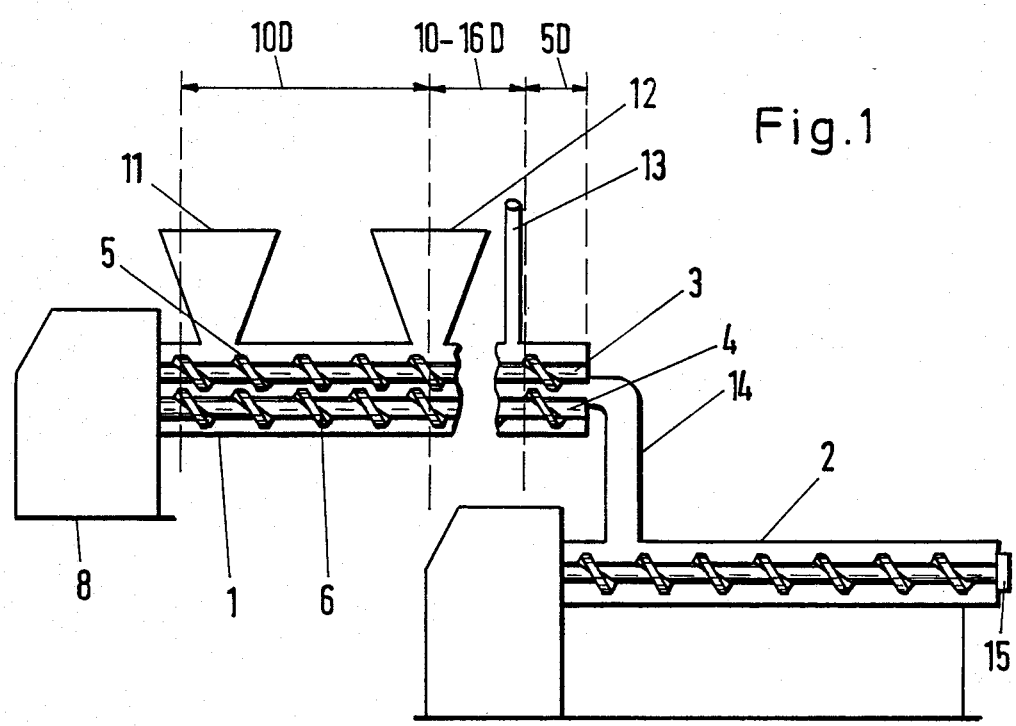
FIG. 1 is a schematic, longitudinal sectional view through a tandem extruder system in accordance with the present invention.
Figure 2:
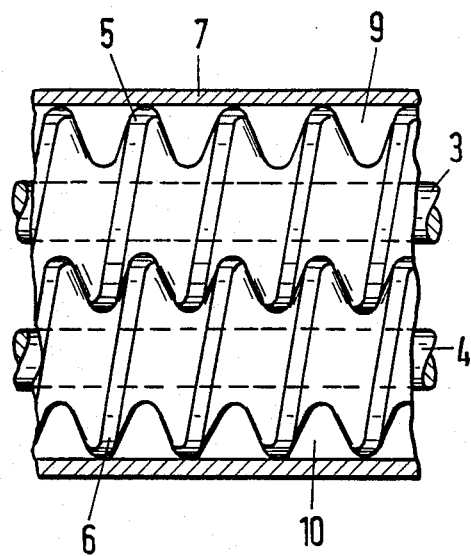
FIG. 2 shows, on an enlarged scale, a detail of a twin-screw extrusion device forming part of the extruder system shown in FIG. 1.
Figure 3:
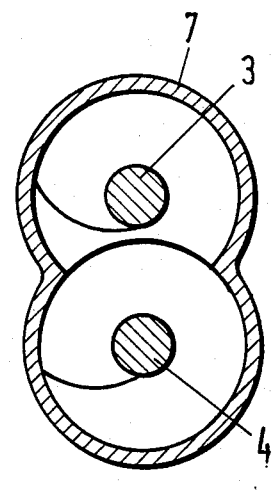
FIG. 3 is a cross-sectional view taken along the line III—III of FIG. 2.

In FIG. 1 there is shown a tandem extruder system which comprises an homogenising extruder 1 and a cooling extruder 2. The homogenising extruder 1 is a twin-screw extruder. The screws 3 and 4 of the extruder 1 have helical flights 5 and 6 respectively disposed thereon. The screws 3 and 4 are rotatably disposed within a housing 7.

The screws 3 and 4 are set in rotation by a transmission unit, including a drive mechanism 8, the speed of which is steplessly adjustable. The flights 5 and 6 of the screws 3 and 4 intermesh with one another. This causes substantially all of a plastics material located within the extruder 1 and located in the troughs 9 and 10 formed between adjacent crests of the flights of the screws 3 and 4 to be advanced. Accordingly, the dwell time of the plastics material in the twin-screw extruder can be accurately set. By increasing or reducing the rate of rotation of the screws 3 and 4, therefore, any particular desired dwell time can be appropriately set for the specific plastics material located in the twin-screw extruder 1.

The twin-screw extruder 1 also includes, in this embodiment, two feed hoppers 11 and 12. the spacing between the feed hoppers is up to ten times the diameter of the screws 3 and 4. This spacing, in conjunction with control of the rate of rotation of the screws and, hence, of the rate of conveyance of the materials, provides an adequate time of impact of the screws on the plastics material which is being introduced in granular form.

The propellant is injected into the mixture of plastics material through a feed conduit 13 at a pressure which is slightly above the pressure subsisting in the twin-screw extruder 1. Alternatively, however, instead of providing the feed conduit 13, a feed hopper may also be provided if a chemical propellant is used which is introduced as a masterbatch in either powdered or granular form.

In such a case, it has proved advantageous to provide another screw portion with a length of approximately five times the diameter of the screw downstream of the hopper so as to permit the propellant to mix satisfactorily with the fused mass before the mixture of material and propellant is conducted through the conduit 14 to the cooling extruder 2. In this latter extruder, the mixture is cooled to a temperature just below the foam point of the propellant.

Subsequent, the fused mass of plastics material is extruded through the nozzle 15, which is shown schematically in FIG. 1, to form a tubular film or a flat profile, the foaming process occurring as the fused mass emerges from the nozzle 15.

Examples of high-molecular weight, high-temperature resistant, low-molecular weight, low-temperature-resistant plastic materials, and propellants have been set forth above. It will be apparent that other materials could also be employed. For example, the high-molecular weight, high-temperature resistant plastics material could additionally comprise an acrylobutadiene styrene polymer, a polycarbonate polymer, a polyvinyl chloride polymer, a polyacrylosulfon polymer and a thermoplastic polyurethane polymer. The low-molecular weight, low-temperature resistant plastics material could additionally comprise polyvinyl chloride. The use of azodicarbonamide as a propellant could be incorporated into a fused plastics material selected from polyolefins and waxes. The propellant could further include the inert gasses carbon dioxide and nitrogen. The blowing agent could be selected from the group consisting of citric acid, sodium bicarbonate and talc.

I claim:

1. A method of producing a foamable mixture of plastics materials from two plastics materials having differing properties in a tandem extruder system comprising first and second screw extrusion devices, said first extrusion device having a variable throughput and having associated therewith sequential, longitudinally spaced first, second and third feed apertures, the method comprising the steps of:
   (a) feeding a high-molecular weight, high-temperature-resistant plastics material into said first extrusion device through said first feed aperture, and fusing said material therein,
   (b) feeding a second low-molecular weight, low-temperature-resistant plastics material, together with a blowing agent, through said second feed aperture into said fused, homogenised high-molecular weight plastics material and fusing and homogenizing said second plastics materials and blowing agent therewith,
   (c) introducing a propellant into said fused and homogenised mixture of said plastics materials and blowing agent through said third feed aperture in said first extrusion device,
   (d) homogenizing said mixture of plastics materials, blowing agent and propellant in the first extruder,
   (e) transferring said homogenised and fused mixture into said second extruder,
   (f) cooling said mixture in said second extruder, and
   (g) extruding said mixture in the form of a foamed tubular film or profile.

2. A method as recited in claim 1, wherein said high-molecular weight, high-temperature resistant plastics material is selected from the group consisting of a polyphenylene oxide polymer, a styrene-maleic acid anhydride polymer, an acrylobutadiene styrene polymer, a polycarbonate polymer, a polyvinyl chloride polymer, a polyacrylosulfon polymer and a thermoplastic polyurethane polymer.

3. A method as recited in claim 1, wherein said low-molecular weight, low-temperature resistant plastics material is selected from the group consisting of polystyrene and polyvinyl chloride.

4. A method as recited in claim 1, wherein said propellant is an azodicarbonamide incorporated into a fused plastics material selected from the group consisting of polyolefins and waxes.

5. A method as recited in claim 1 wherein said propellant is an azodicarbonamide in granular form as a masterbatch granulate.

6. A method as recited in claim 1 wherein said propellant is an azodicarbonamide in powder form.

7. A method as recited in claim 1, wherein said propellant is an inert gas selected from the group consisting of fluorochlorohydrocarbons aliphatic hydrocarbons, carbon dioxide and nitrogen.

8. A method as recited in claim 1, wherein said blowing agent material is selected from the group consisting of citric acid, sodium bicarbonate and talc.

9. The method of claim 1 further including selectively controlling the dwell time of said plastics materials separately and with said propellant by controlling the rate of screw rotation in said first screw extrusion device, and controlling the spacing of said first, second, and third feed apertures whereby the fusion and homogenization process can be adapted to the individual properties of the plastics materials.

10. A tandem extruder system for producing a foamable mixture of two separate plastics materials having differing properties, comprising:
    (a) a first extrusion device comprising a housing, a pair of intermeshing screws of substantially identical diameter rotatable in said housing, and means for driving said screws at selected rates of rotation,
    (b) a first feed aperture communicating with the interior of said first extrusion device for feeding a first plastics material to said device for fusing therein,
    (c) a second feed aperture communicating with the interior of said first extrusion device and disposed downstream of said first feed aperture at a spacing of about ten times the diameter of said screws to permit said first plastics material to be fused while in such spacing, a second plastics material being fed through said second feed aperture to the interior of said first extrusion device for mixing with said fused first plastics material,
    (d) a third feed aperture communicating with the interior of said first extrusion device and disposed downstream of said second feed aperture at a spacing of about twenty to about twenty-five times the diameter of said screws, a propellant being fed through said third feed aperture for mixing with said fused plastics material, and
    (e) a second extrusion device spaced downstream of said first extrusion device for cooling said fused mixture prior to extrusion.

11. A tandem extrusion system as recited in claim 10 wherein said means for driving said screws includes means for adjusting the rate of rotation of said screws so as to vary the dwell time of material disposed in said first extrusion device and thus vary the throughput of said device.

* * * * *